(12) United States Patent
Dar et al.

(10) Patent No.: US 12,271,596 B2
(45) Date of Patent: Apr. 8, 2025

(54) EFFECTIVE NOISE REMOVAL TECHNIQUES FOR BIASED MACHINE LEARNING BASED OPTIMIZATIONS IN STORAGE SYSTEMS

(71) Applicant: Dell Products L.P., Round Rock, TX (US)

(72) Inventors: Shaul Dar, Petach Tikva (IL); Ramakanth Kanagovi, Telangana (IN); Guhesh Swaminathan, Chennai (IN); Rajan Kumar, Bihar (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/230,762

(22) Filed: Aug. 7, 2023

(65) Prior Publication Data
US 2025/0053300 A1     Feb. 13, 2025

(51) Int. Cl.
*G06F 3/06*     (2006.01)

(52) U.S. Cl.
CPC .......... *G06F 3/0611* (2013.01); *G06F 3/0653* (2013.01); *G06F 3/067* (2013.01)

(58) Field of Classification Search
CPC ....................................................... G06F 3/06
See application file for complete search history.

(56) References Cited

U.S. PATENT DOCUMENTS

| | | | |
|---|---|---|---|
| 8,433,848 B1 | 4/2013 | Naamad et al. | |
| 9,635,049 B1 | 4/2017 | Oprea et al. | |
| 10,353,616 B1 * | 7/2019 | Tao | G06F 3/061 |
| 10,523,756 B1 * | 12/2019 | Chakraborty | G06F 3/0685 |
| 10,613,962 B1 * | 4/2020 | Delange | G06F 11/3006 |
| 11,182,321 B2 | 11/2021 | Pinho et al. | |
| 11,327,676 B1 * | 5/2022 | Fernandez | G06F 12/0862 |
| 11,397,529 B2 * | 7/2022 | Chen | G06F 3/0653 |

(Continued)

OTHER PUBLICATIONS

Dar, Shaul, et al.; "Early and Adaptive Stream Sampling System and Method for Machine Learning-Based Optimizations in Storage Systems," U.S. Appl. No. 18/133,110, filed Apr. 11, 2023.

(Continued)

*Primary Examiner* — Khoa D Doan
(74) *Attorney, Agent, or Firm* — BainwoodHuang

(57) ABSTRACT

Techniques for performing effective noise removal for biased machine learning (ML) based optimizations in storage systems. The techniques include serving, by a storage system, an IO workload, identifying, using ML from among a plurality of storage objects subject to the IO workload, storage objects with low temperatures (e.g., cold storage objects) or likely to have low temperatures in the near future, and removing them from subsequent temperature forecasting analysis, effectively treating such cold storage objects as "noise." The techniques further include performing the temperature forecasting analysis on remaining ones of the plurality of storage objects such as those with high temperatures (e.g., hot storage objects). In this way, temperature forecasting or prediction is performed, using ML, in a biased fashion over a relatively narrow spectrum of storage object temperatures, thereby improving tiering and data prefetching performance, reducing memory and processing overhead, and so on.

20 Claims, 3 Drawing Sheets

(56) References Cited

U.S. PATENT DOCUMENTS

| | | |
|---|---|---|
| 11,651,269 B2 | 5/2023 | Chenxi et al. |
| 2023/0281049 A1* | 9/2023 | Dong .................... G06F 3/065 718/104 |

OTHER PUBLICATIONS

Dar, Shaul, et al.; "Systems and Methods of Forecasting Temperatures of Storage Objects Using Machine Learning," U.S. Appl. No. 17/847,449, filed Jun. 23, 2022.

* cited by examiner

EFFECTIVE NOISE REMOVAL TECHNIQUES FOR BIASED MACHINE LEARNING BASED OPTIMIZATIONS IN STORAGE SYSTEMS

BACKGROUND

Storage systems include processing circuitry and arrays of storage devices such as solid-state drives (SSDs) and hard disk drives (HDDs). The processing circuitry performs input/output (IO) operations (e.g., read operations, write operations) in response to storage IO requests (e.g., read requests, write requests) from storage clients communicably coupled to the storage systems. The IO operations cause data blocks, data files, data pages, or other data elements specified in the storage IO requests to be read from or written to volumes, logical units, filesystems, data streams, data extents, data slices, or other storage objects maintained on the storage devices. In their decision-making regarding data tiering in the storage arrays, data prefetching in cache memories, load balancing across clusters of storage systems, data placement and/or movement in the "cloud" or combined on-premises/cloud environments, and so on, the storage systems typically base their decisions, at least in part, on levels of IO activity (or "temperatures") of the storage objects involved.

SUMMARY

When determining the temperatures of storage objects, storage systems can take into account several factors such as the number of IO operations performed in a given time interval and/or the amount or frequency of data accessed in response to a workload of storage IO requests (or "IO workload"). Storage objects with high levels of IO activity (or "high temperatures") can be regarded as hot storage objects, while storage objects with low levels of IO activity (or "low temperatures") can be regarded as cold storage objects. Further, storage objects with intermediate levels of IO activity between the high and low IO activity levels can be regarded as warm storage objects. In a storage system with a two-tiered storage array, storage systems can reduce IO latency by placing the hot storage objects in an upper storage tier that uses high-speed SSDs, and placing the cold storage objects in a lower storage tier that uses low-speed HDDs. Storage systems can further reduce or substantially hide IO latency by prefetching hot storage objects in internal cache memories. Moreover, by forecasting or predicting future temperatures of storage objects, storage systems can obtain performance gains in terms of IO latency, IO operations per second (IOPS), and/or bandwidth (BW). For example, such storage systems may use statistical techniques such as a simple moving average, a weighted moving average, or an exponential moving average to forecast or predict the future temperature levels of storage objects. To increase the accuracy of such temperature forecasting or prediction, storage systems may perform techniques based on machine learning (ML).

The IO workload of a storage system can be characterized by a workload skew level, which can be expressed in terms of the distribution of IO operations over used storage capacity. For example, the workload skew level may conform to the Pareto principle (or 80/20 rule), such that about 80% of IO operations performed by the storage system are in about 20% of the used storage capacity. In other words, about 20% of the used storage capacity may have storage objects with high temperatures, while the remaining percentage of the used storage capacity (up to about 80%) may have storage objects with low temperatures. As such, the used storage capacity can have a relatively small number of very active or hot storage objects (e.g., subject to tens of thousands or more storage IO requests), as well as a large number of essentially idle or cold storage objects (e.g., subject to significantly fewer or zero (0) storage IO requests). Unfortunately, the accuracy of storage object temperature forecasting or prediction, whether using statistical or ML-based techniques, can suffer when performed over such a broad spectrum of IO activity.

Techniques are disclosed herein for performing effective noise removal for biased machine learning (ML) based optimizations in storage systems. With regard to a spectrum of IO activity for storage objects that spans at least an upper range and a lower range of IO activity levels, the disclosed techniques can employ a temperature forecasting ML model that is biased toward the upper range. For example, the upper range may correspond to 20% or any other suitable percentage of the spectrum of IO activity levels. As such, storage objects with IO activity levels in the lower range or percentage (e.g., 80%) of the spectrum may have no practical importance, and may therefore be removed as "noise" from the temperature forecasting ML model. Such noise storage objects (e.g., volumes, files, data slices) can correspond to storage objects that will have little or no IO activity in the near future, and therefore their inclusion in the temperature forecasting ML model would adversely affect its ability to focus on its primary task, namely, assisting tiering policies by identifying storage objects that will likely be the most hot in the near future. For this reason, the temperature forecasting ML model is referred to as "biased" in the present disclosure.

The disclosed techniques can provide a number of benefits including improved tiering and data prefetching performance, reduced memory and processing overhead, and so on. The disclosed techniques take into account the observation that the skew level of a workload of storage IO requests can conform to the Pareto principle (or 80/20 rule), which can lead to about 20% of used storage capacity having storage objects with high IO activity levels (i.e., high temperatures) and about 80% of the used storage capacity having storage objects with low IO activity levels (i.e., low temperatures). The disclosed techniques can include identifying, using ML, storage objects that have or are likely to have low temperatures in the near future, and removing them from subsequent temperature forecasting analysis, effectively treating such storage objects as noise. The disclosed techniques can further include performing, using ML, the temperature forecasting analysis on the remaining storage objects that currently have high temperatures in order to forecast or predict their future temperatures with increased accuracy. In this way, storage object temperature forecasting or prediction can be performed, using ML, in a biased manner over a relatively narrow range of IO activity levels, thereby improving tiering and data prefetching performance, reducing memory and processing overhead, and so on.

In certain embodiments, a method includes serving an input/output (IO) workload by a storage system, in which a plurality of storage objects are subject to the IO workload. The method further includes identifying, from among the plurality of storage objects, storage objects likely to have predetermined temperatures in a near future using a first machine learning (ML) model, in which the plurality of storage objects include the identified storage objects and a plurality of remaining storage objects. The method further includes forecasting, by model inference, temperatures of the plurality of remaining storage objects using a second ML model, and performing tiering operations on the plurality of remaining storage objects based on the forecasted temperatures.

In certain arrangements, the plurality of storage objects have temperatures spanning a spectrum of storage object temperatures, in which the spectrum of storage object temperatures includes at least a first range of low temperatures and a second range of high temperatures. The method further includes identifying the storage objects likely to have low temperatures within the first range of the spectrum.

In certain arrangements, the plurality of remaining storage objects have high temperatures within the second range of the spectrum and constitute a minority of the plurality of storage objects. The method further includes forecasting the temperatures of the minority of the plurality of storage objects having high temperatures within the second range of the spectrum.

In certain arrangements, the method further includes obtaining training data that includes data corresponding to storage objects having temperatures spanning both the first range and the second range of the spectrum of storage object temperatures, and training the second ML model using the training data.

In certain arrangements, the method further includes obtaining training data that includes data corresponding to storage objects having temperatures spanning only the second range of the spectrum of storage object temperatures, and training the second ML model using the training data.

In certain arrangements, the plurality of storage objects have temperatures spanning a spectrum of storage object temperatures, in which the spectrum of storage object temperatures includes at least a first range of low temperatures and a second range of high temperatures. The method further includes identifying the storage objects likely to have high temperatures within the second range of the spectrum.

In certain arrangements, the plurality of remaining storage objects have low temperatures within the first range of the spectrum and constitute a majority of the plurality of storage objects. The method further includes forecasting the temperatures of the majority of the plurality of storage objects having low temperatures within the first range of the spectrum.

In certain arrangements, the method further includes obtaining training data that includes data corresponding to storage objects having temperatures spanning only the first range of the spectrum of storage object temperatures, and training the second ML model using the training data.

In certain embodiments, a system includes a memory and processing circuitry configured to execute program instructions out of the memory to serve an input/output (IO) workload, in which a plurality of storage objects are subject to the IO workload. The processing circuitry is further configured to execute the program instructions out of the memory to identify, from among the plurality of storage objects, storage objects likely to have predetermined temperatures in a near future using a first machine learning (ML) model, in which the plurality of storage objects include the identified storage objects and a plurality of remaining storage objects. The processing circuitry is further configured to execute the program instructions out of the memory to forecast, by model inference, temperatures of the plurality of remaining storage objects using a second ML model, and perform tiering operations on the plurality of remaining storage objects based on the forecasted temperatures.

In certain arrangements, the plurality of storage objects have temperatures spanning a spectrum of storage object temperatures, in which the spectrum of storage object temperatures includes at least a first range of low temperatures and a second range of high temperatures. The processing circuitry is further configured to execute the program instructions out of the memory to identify the storage objects likely to have low temperatures within the first range of the spectrum.

In certain arrangements, the plurality of remaining storage objects have high temperatures within the second range of the spectrum and constitute a minority of the plurality of storage objects. The processing circuitry is further configured to execute the program instructions out of the memory to forecast the temperatures of the minority of the plurality of storage objects having high temperatures within the second range of the spectrum.

In certain arrangements, the processing circuitry is further configured to execute the program instructions out of the memory to obtain training data that includes data corresponding to storage objects having temperatures spanning both the first range and the second range of the spectrum of storage object temperatures, and train the second ML model using the training data.

In certain arrangements, the processing circuitry is further configured to execute the program instructions out of the memory to obtain training data that includes data corresponding to storage objects having temperatures spanning only the second range of the spectrum of storage object temperatures, and train the second ML model using the training data.

In certain arrangements, the plurality of storage objects have temperatures spanning a spectrum of storage object temperatures, in which the spectrum of storage object temperatures includes at least a first range of low temperatures and a second range of high temperatures. The processing circuitry is further configured to execute the program instructions out of the memory to identify the storage objects likely to have high temperatures within the second range of the spectrum.

In certain arrangements, the plurality of remaining storage objects have low temperatures within the first range of the spectrum and constitute a majority of the plurality of storage objects. The processing circuitry is further configured to execute the program instructions out of the memory to forecast the temperatures of the majority of the plurality of storage objects having low temperatures within the first range of the spectrum.

In certain arrangements, the processing circuitry is further configured to execute the program instructions out of the memory to obtain training data that includes data corresponding to storage objects having temperatures spanning only the first range of the spectrum of storage object temperatures, and train the second ML model using the training data.

In certain embodiments, a computer program product includes a set of non-transitory, computer-readable media having instructions that, when executed by processing circuitry, cause the processing circuitry to perform a method including serving an input/output (IO) workload by a storage system, in which a plurality of storage objects are subject to the IO workload. The method further includes identifying, from among the plurality of storage objects, storage objects likely to have predetermined temperatures in a near future using a first machine learning (ML) model, in which the plurality of storage objects include the identified storage objects and a plurality of remaining storage objects. The method further includes forecasting, by model inference, temperatures of the plurality of remaining storage objects using a second ML model, and performing tiering operations on the plurality of remaining storage objects based on the forecasted temperatures.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

FIG. 2 is a diagram of an exemplary spectrum of input/output (IO) activity of storage objects (e.g., data slices) subject to a workload of storage IO requests served by the storage system of FIG. 1a.

DETAILED DESCRIPTION

Techniques are disclosed herein for performing effective noise removal for biased machine learning (ML) based optimizations in storage systems. The disclosed techniques can include serving, by a storage system, an input/output (IO) workload, identifying, using ML, from among a plurality of storage objects subject to the IO workload, storage objects that have low temperatures or are likely to have low temperatures in the near future, and removing them from subsequent temperature forecasting analysis, effectively treating such storage objects as "noise." The disclosed techniques can further include performing, using ML, the temperature forecasting analysis on the remaining storage objects that currently have high temperatures, including forecasting or predicting their future temperatures. In this way, temperature forecasting or prediction can be performed, using ML, in a biased manner over a relatively narrow range of storage object temperatures, thereby improving tiering and data prefetching performance, reducing memory and processing overhead, and so on.

Figure 1A:
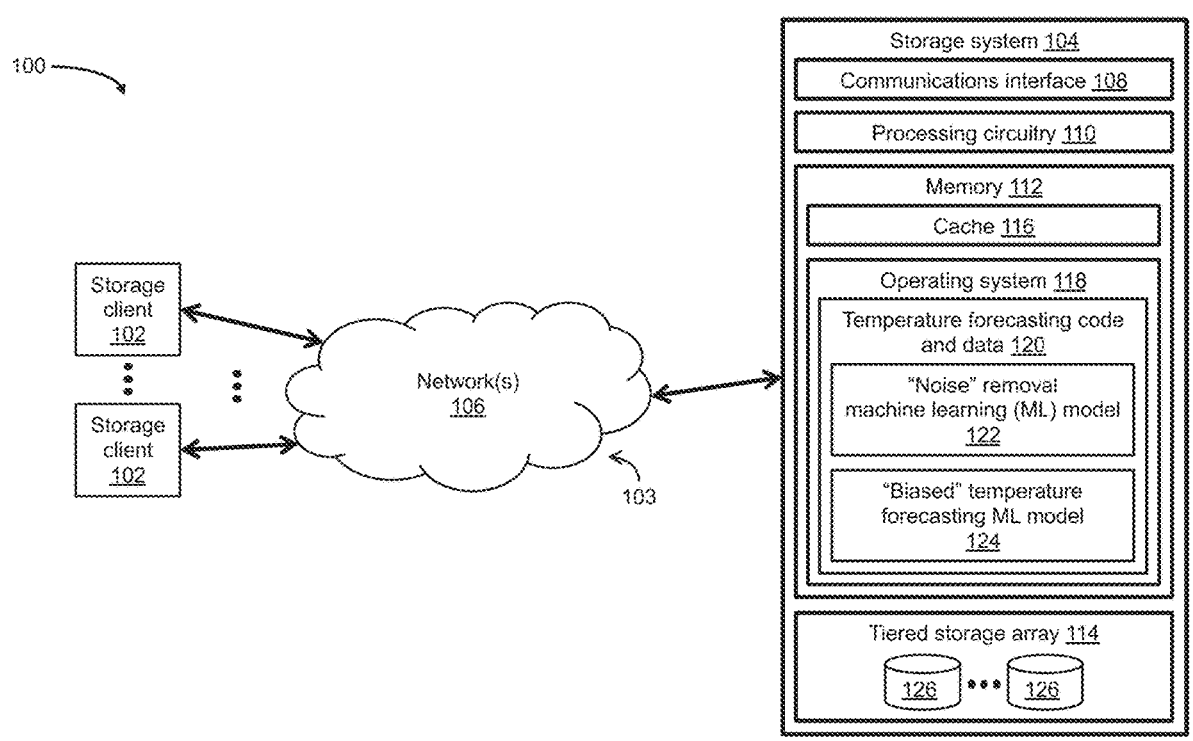
FIG. 1a is a block diagram of an exemplary storage environment, in which techniques can be practiced for performing effective noise removal for biased machine learning (ML) based optimizations in a storage system.

FIG. 1a depicts an illustrative embodiment of an exemplary storage environment 100, in which techniques can be practiced for performing effective noise removal for biased ML based optimizations in storage systems. As shown in FIG. 1a, the storage environment 100 can include a plurality of storage client computers ("storage client(s)") 102 communicably coupled to a storage system 104 by a communications medium 103, which can include at least one network 106. For example, each of the plurality of storage clients 102 may be configured as an email server computer, a file server computer, a web server computer, and/or any other suitable client computer, server computer, or computerized device. The storage clients 102 may be further configured to provide, over the network(s) 106, storage input/output (IO) requests (e.g., small computer system interface (SCSI) commands, network file system (NFS) commands) to the storage system 104. In response to the storage IO requests (e.g., read requests, write requests), processing circuitry 110 included in the storage system 104 can perform IO operations (e.g., read operations, write operations) that cause data blocks, data files, data pages, and/or any other suitable data elements specified in the storage IO requests to be read from or written to volumes, logical units, filesystems, data streams, data extents, data slices, or any other suitable storage objects maintained on one or more storage devices 126 of the storage system 104. The storage system 104 can be configured as a standalone storage system including a single storage appliance, a clustered storage system including two or more storage appliances, a cloud-based storage system, or any other suitable storage system or appliance.

The communications medium 103 can be configured to interconnect the storage clients 102 with the storage system 104 to enable them to communicate and exchange data and control signaling. As shown in FIG. 1a, the communications medium 103 can be illustrated as a "cloud" to represent different network topologies such as a storage area network (SAN) topology, a network-attached storage (NAS) topology, a direct-attached storage (DAS) topology, a local area network (LAN) topology, a metropolitan area network (MAN) topology, a wide area network (WAN) topology, or any suitable combination thereof. As such, the communications medium 103 can include copper-based data communications devices and cabling, fiber optic devices and cabling, wireless devices, or any suitable combination thereof.

As shown in FIG. 1a, the storage system 104 can include a communications interface 108, the processing circuitry (e.g., one or more processors) 110, at least one memory 112, and a storage array 114, which can be configured as a tiered storage array or any other suitable storage array. The communications interface 108 can include an Ethernet interface, an InfiniBand interface, a Fiber Channel interface, and/or any other suitable communications interface. The communications interface 108 can further include SCSI target adapters, network interface adapters, and/or any other suitable adapters for converting electronic, optical, and/or wireless signals received over the network(s) 106 to a form suitable for use by the processing circuitry 110.

The processing circuitry 110 can be configured to process storage IO requests (e.g., read requests, write requests) issued by the storage clients 102 and store client data in a redundant array of independent disk (RAID) environment implemented on the tiered storage array 114. The tiered storage array 114 can include the storage devices 126 such as solid-state drives (SSDs), hard disk drives (HDDs), flash drives, hybrid drives, optical drives, and/or any other suitable storage drives or devices. The storage devices 126 can be configured to store volumes, logical units, filesystems, data streams, data extents, data slices, and/or any other suitable storage objects for hosting data storage of client applications (e.g., email client applications, file client applications, web client applications) running on the storage clients 102.

The memory 112 can include persistent memory (e.g., flash memory, magnetic memory) and non-persistent memory (e.g., dynamic random-access memory (DRAM), static random-access memory (SRAM)), including an internal cache 116 for use in data prefetching. The memory 112 can store an operating system (OS) 118 such as a Linux OS, Unix OS, Windows OS, or any other suitable operating system, as well as a variety of software constructs realized in the form of specialized code and data such as temperature forecasting code and data 120. As shown in FIG. 1*a*, the temperature forecasting code and data 120 can include a plurality of machine learning (ML) models such as a "noise" removal ML model 122 and a "biased" temperature forecasting ML model 124.

It is noted that a minority of storage objects maintained on the storage devices 126 may be active or "hot," e.g., up to 10,000 or more IO accesses may be performed on such storage objects during a given time interval, while a majority of the storage objects may be inactive or "cold," e.g., significantly fewer or zero (0) IO accesses may be performed on such storage objects during the given time interval. The disclosed techniques can employ the noise removal ML model 122 to identify storage objects that have low temperatures or are likely to have low temperatures in the near future, and remove them from subsequent temperature forecasting analysis, effectively treating such storage objects as noise. The disclosed techniques can then employ the temperature forecasting ML model 124 to forecast or predict future temperatures of the remaining storage objects that currently have high temperatures in a biased manner over a relatively narrow range of storage object temperatures. For example, the temperatures of storage objects may be defined in terms of the total number of IO operations per second (IOPS) performed on the storage objects, the number of read IOPS performed on the storage objects, the number of write IOPS performed on the storage objects, the total bandwidth (BW) associated with the storage objects, the read BW associated with the storage objects, the write BW associated with the storage objects, and/or any other suitable temperature definition. The temperature forecasting code and data 120 can be executed by the processing circuitry 110 to carry out the techniques and/or methods disclosed herein.

In the context of the processing circuitry 110 being configured to execute specialized code and data (e.g., program instructions) out of the memory 112, a computer program product can be configured to deliver all or a portion of the program instructions and/or data to the processing circuitry 110. Such a computer program product can include one or more non-transient computer-readable storage media such as a magnetic disk, a magnetic tape, a compact disk (CD), a digital versatile disk (DVD), an optical disk, a flash drive, a solid-state drive (SSD), a secure digital (SD) chip or device, an application specific integrated circuit (ASIC), a field programmable gate array (FPGA), and so on. The non-transient computer-readable storage media can be encoded with sets of program instructions and/or data for performing, when executed by the processing circuitry 110, the various techniques and/or methods disclosed herein.

Figure 1B:
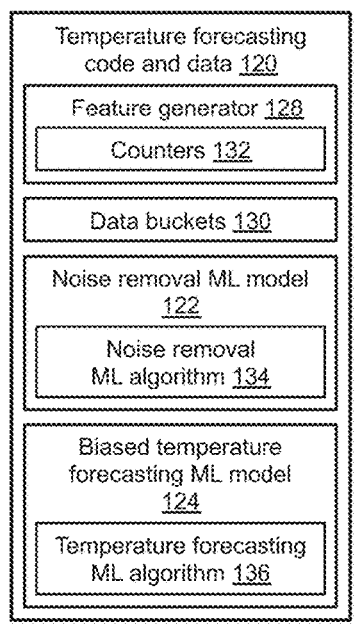
FIG. 1b is a block diagram of exemplary temperature forecasting code and data included in the storage system of FIG. 1a, in which the temperature forecasting code and data includes a feature generator, a plurality of data buckets, a noise removal ML model, and a biased temperature forecasting ML model.

FIG. 1*b* depicts a more detailed view of the temperature forecasting code and data 120 stored in the memory 112 of FIG. 1*a*. As shown in FIG. 1*b*, the temperature forecasting code and data 120 can include a feature generator 128, a plurality of data buckets 130, the noise removal ML model 122, and the temperature forecasting ML model 124. The feature generator 128 can be configured to generate a plurality of features relevant to the temperature of a storage object maintained on one or more of the storage devices 126. For a storage object over a given time interval, the plurality of features relevant to the temperature of the storage object can include:

the total number of IO operations per second (IOPS);
the number of read operations;
the number of write operations;
the number of non-IO operations;
the percentage of the total number of IO operations that are read operations;
the percentage of the total number of IO operations that are write operations; and/or the percentage of the total number of IO and non-IO operations that are non-IO operations.

Alternatively, or in addition, for a storage object over a given time interval, the plurality of features relevant to the temperature of the storage object can further include:

the average size of the read operations;
the average size of the write operations;
the standard deviation of the sizes of the read operations;
the standard deviation of the sizes of the write operations;
the average time between successive arrivals (or "average interarrival time") of the IO operations;
the average interarrival time of the read operations;
the average interarrival time of the write operations;
the average difference between start logical block addresses (or "average delta LBA") of successive IO operations;
the average delta LBA of successive read operations;
the average delta LBA of successive write operations;
the percentage of successive pairs of IO operations that include two (2) read operations;
the percentage of successive pairs of IO operations that include a read operation followed by a write operation;
the percentage of successive pairs of IO operations that include a write operation followed by a read operation;
the percentage of successive pairs of IO operations that include two (2) write operations;
the percentage of successive pairs of read operations, in which the start LBA of the second read operation immediately follows the end LBA of the first read operation; and/or
the percentage of successive pairs of write operations, in which the start LBA of the second write operation immediately follows the end LBA of the first write operation.

As shown in FIG. 1*b*, the feature generator 128 can include a number of in-memory counters (or "counters") 132, which can act as temporary variables for calculating or generating features relevant to the temperature of a storage object. As described herein with reference to an illustrative example, for each IO operation performed on a storage object during successive time intervals, the feature generator 128 can update (e.g., increment, decrement) the counters 132. Further, at the end of each successive time interval, the feature generator 128 can aggregate the counters 132 and perform feature engineering calculations to obtain the features relevant to the storage object's temperature. The obtained features form a dataset that can be applied as input to the noise removal ML model 122 and/or the temperature forecasting ML model 124, as appropriate.

As described herein, a majority of the storage objects maintained on the storage devices 126 may be inactive or cold during a given time interval, while a minority of the storage objects may be active or hot during the given time interval. In one embodiment, data from the input dataset can be assigned or distributed across the plurality of data buckets 130, each of which can correspond to a range of temperatures defined in terms of the average total IOPS performed on the storage objects, the average total BW associated with the storage objects, or any other suitable temperature definition. The data from the input dataset can be split into training data, validation data, and testing data for a noise removal ML algorithm 134 used to generate the noise removal ML model 122, and/or a temperature forecasting ML algorithm 136 used to generate the temperature forecasting ML model 124, as appropriate. For example, each of the ML algorithms 134, 136 may be implemented as a random forest algorithm, a gradient boosting algorithm, or any other suitable regression ML algorithm, classification ML algorithm, or other ML algorithm.

During operation, the disclosed techniques can perform effective noise removal for biased ML based optimizations in the storage system 104. The disclosed techniques take into account the observation that the skew level of a workload of storage IO requests (e.g., read requests, write requests) can conform to the Pareto principle (or 80/20 rule), which can lead to about 20% of used storage capacity having storage objects with high temperatures (e.g., hot storage objects) and about 80% of the used storage capacity having storage objects with low temperatures (e.g., cold storage objects). The disclosed techniques can include identifying, using the noise removal ML model 122, the cold storage objects or those likely to become cold in the near future, and removing them from subsequent temperature forecasting analysis, effectively treating such storage objects as noise. The disclosed techniques can further include forecasting or predicting, using the temperature forecasting ML model 124, future temperatures of the remaining storage objects, which can include those that currently have high temperatures. In this way, temperature forecasting or prediction can be performed, using ML, in a biased manner over a relatively narrow range of storage object temperatures, thereby improving tiering and data prefetching performance, reducing memory and processing overhead, and so on.

Figure 2:
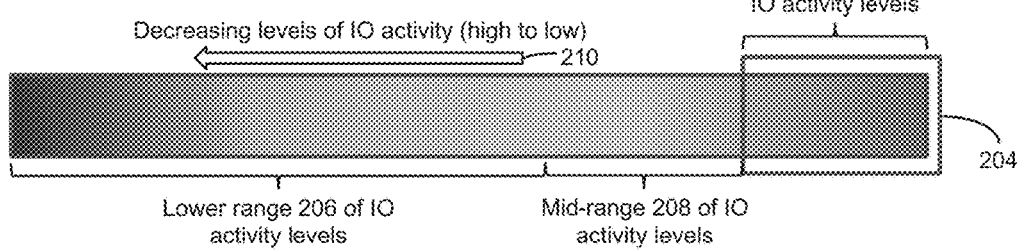

The disclosed techniques for performing effective noise removal for biased ML based optimizations in storage systems will be further understood with reference to the following illustrative example and FIGS. 1a, 1b, and 2. In this example, input datasets for the ML models 122, 124 (see FIG. 1a) are obtained in response to multiple IO workload traces (or "IO traces") collected from one or more user sites. Such IO traces can provide indications of (i) the types of IO operations (e.g., read operation, write operation) performed on storage objects (e.g., data slice(s) or "slice(s)") in response to the IO workload, (ii) the sizes of the IO operations, (iii) timestamps associated with the IO operations, and (iv) addresses of the slices in an addressable storage space. The storage system 104 performs the IO operations to cause data elements (e.g., data blocks) to be read from and/or written to the slices maintained on the storage devices 126 of the tiered storage array 114.

In this example, for each IO operation performed on a slice, the storage system 104 captures statistics associated with the IO operation, such as (i) a storage client identifier (ID), (ii) a volume (VOL) ID, (iii) a logical unit number (LUN), (iv) a timestamp, (v) a command (e.g., read command, write command), (vi) a logical block address (LBA) of the slice, (vii) a size of the IO operation (e.g., read size, write size), and/or (viii) an indication of an IO pattern associated with the IO operation (e.g., random pattern, sequential pattern). Further, for each IO operation performed on a slice during successive time intervals (e.g., 5-minute intervals), the storage system 104 executes the feature generator 128 (see FIG. 1b), updating (e.g., incrementing, decrementing) at least some of the plurality of counters 132, which, at the end of each time interval, are used to generate a plurality of features relevant to the temperature of the slice. The plurality of features can include at least the number of IO operations per second (IOPS) performed on the slice, the number of read operations performed on the slice, the number of write operations performed on the slice, the number of non-IO operations performed on the slice, the percentage of the number of IO operations that are read operations, the percentage of the number of IO operations that are write operations, and the percentage of the number of IO and non-IO operations that are non-IO operations. During each successive time interval, the feature generator 128 updates the counters 132 to maintain running counts of the number of IOPS performed on the slice, the number of read operations performed on the slice, the number of write operations performed on the slice, and the number of non-IO operations performed on the slice, for that time interval. At the end of each successive time interval, the feature generator 128 generates the plurality of features by aggregating the updated counters 132 and performing feature engineering calculations, such as those necessary to obtain the percentages pertaining to the number of read operations, the number of write operations, the number of non-IO operations, and so on.

The plurality of features generated by the feature generator 128 form datasets that can be applied as input to the noise removal ML model 122 and the temperature forecasting ML model 124, as appropriate. In this example, the noise removal ML algorithm 134 used to generate the noise removal ML model 122 is implemented as a random forest algorithm. Data from the input datasets can be assigned or distributed across eight (8) (or any other suitable number) of the plurality of data buckets 130, each of which corresponds to a range of slice temperatures defined in terms of average total BW with values represented in logical units (e.g., 512 bytes), as shown in TABLE I below:

TABLE I

| Data Buckets (1-8) | Average Total BW (log values) |
|---|---|
| 1 | Less than 3 |
| 2 | 3 to 10 |
| 3 | 10 to 32 |
| 4 | 32 to 100 |
| 5 | 100 to 316 |
| 6 | 316 to 1000 |
| 7 | 1000 to 3162 |
| 8 | Greater than 3162 |

For example, as shown in TABLE I, data bucket "1" may contain less than 1,000 logical units, so the log value for the corresponding average total BW may be less than $\log_{10}(1,000)$ or "3." In this example, data for a majority of the slices (e.g., about 80%) are assigned or distributed across data buckets 1-5, and data for a minority of the slices (e.g., about 20%) are assigned or distributed across data buckets 6-8. By assigning or distributing the data from the input datasets across the data buckets 1-8, the storage system 104 can easily determine that most of the slices maintained on the storage devices 126 have low to intermediate levels of IO activity (e.g., the slice temperatures range from cold to warm), and a lesser amount of the slices maintained on the storage devices 126 have high levels of IO activity (e.g., the slice temperatures are hot).

FIG. 2 depicts a spectrum 200 of IO activity for the slices maintained on the storage devices 126. As shown in FIG. 2, the spectrum 200 includes an upper range 202 of IO activity levels (within a reference box 204), a lower range 206 of IO activity levels, and a mid-range 208 of IO activity levels. As further shown in FIG. 2, decreasing levels of IO activity (from high to low) are indicated by a directional arrow 210. In this example, the slices with IO activity levels in the mid-range 208 are referred to as warm slices, which may transition to hot slices or cold slices in the near future. With reference to the spectrum 200, the upper range 202 corresponds to the hot slices with high levels of IO activity (e.g., about 20% of the slices), the lower range 206 corresponds to the cold slices with low levels of IO activity (e.g., about 60% of the slices), and the mid-range 210 corresponds to the warm slices with intermediate levels of IO activity (e.g., about 20% of the slices). As such, the cold and warm slices corresponding to the lower and mid ranges 206, 208, respectively, constitute the majority of the slices (e.g., about 80%) maintained on the storage devices 126, while the hot slices corresponding to the upper range 202 constitute the minority of the slices (e.g., about 20%) maintained on the storage devices 126. It is noted that any other suitable ranges of IO activity levels (or temperatures) of the slices within the spectrum 200 are possible.

In this example, a set of ninety (90) IO traces (or any other suitable number) are collected from the user site(s) and split into training data, validation data, and testing data for the noise removal ML algorithm 134 and the temperature forecasting ML algorithm 136, as appropriate. Further, seventy (70) IO traces (or any other suitable number) from among the 90 IO traces are used to obtain the training/validation data, and twenty (20) IO traces (or any other suitable number) from among the 90 IO traces are used to obtain the testing data. The noise removal ML algorithm 134 is trained, validated, and tested using the training, validation, and testing data, respectively, thereby generating the noise removal ML model 122. In this example, the noise removal ML model 122 is configured to identify or classify, from input datasets, slices with forecasted or predicted levels of IO activity that will be zero or below a predetermined minimum level in the near future. In one embodiment, the predetermined minimum level of IO activity can be provided as a parameter of the noise removal ML model 122. For example, the predetermined minimum level of IO activity may be defined as an absolute number value or a percentage (%) of the average IO activity of all the slices. In likewise fashion, the temperature forecasting ML algorithm 136 is trained, validated, and tested to generate the temperature forecasting ML model 124. In one embodiment, the training data for the temperature forecasting ML algorithm 136 covers the full spectrum 200 of IO activity for the slices. In other words, the training data for the temperature forecasting ML algorithm 136 can include data corresponding to slices with IO activity levels (or temperatures) ranging from the upper range 202, through the mid-range 208, to the lower range 206 of the spectrum 200.

Once the noise removal ML model 122 and the temperature forecasting ML model 124 have been generated, a working input dataset is obtained in response to at least one additional IO trace collected from the user site(s), and a plurality of features relevant to slice temperatures are generated from the working input dataset. The plurality of features are applied as input to the noise removal ML model 122, which, in response to the input, preprocesses the plurality of features to identify cold slices likely to remain cold in the near future and/or warm slices likely to become cold in the near future, within the lower and mid ranges 206, 208 of the spectrum 200. Data corresponding to the identified slices are then removed as noise from the plurality of features, effectively making the feature data more homogeneous. The resulting feature data, with the data for the identified slices removed, are applied as input to the temperature forecasting ML model 124, which, in response to the input, produces, by model inference, forecasted or predicted temperatures for the hot slices within the upper range 202 of the spectrum 200. For example, such model inference may be performed, at specified time intervals (e.g., 1-hour intervals), by the temperature forecasting ML model 124 implemented as a regression ML model. In this way, the storage system 104 can perform slice temperature forecasting or prediction in a biased manner over the relatively narrow upper range 202 of IO activity levels, thereby reducing error in slice temperature forecasting and prediction for improved tiering and data prefetching performance.

In one experimental case, the effect of removing noise data during model inference on the performance of the temperature forecasting ML model 124 is shown in TABLE II below:

TABLE II

| | Hit ratio % -Read BW- | Hit ratio % -Total BW- | Hit ratio % -Read IO- | Hit ratio % -Total IO- | Latency (milliseconds) |
|---|---|---|---|---|---|
| Model inference without noise removal | 85.91% | 79.67% | 69.67% | 56.69% | 0.20 msec |
| Model inference with noise removal | 86.73% | 80.81% | 71.02% | 57.58% | 0.189 msec |
| Simple moving average (SMA) | 46.00% | 42.05% | 51.20% | 42.97% | 0.572 msec |

With reference to TABLE II, a comparison of the resulting hit ratio percentages (Hit ratio %) when performing "model inference without noise removal" and "model inference with noise removal" shows that improved tiering and data prefetching performance can be achieved across all hit ratio metrics. Further, a comparison of the resulting latency (Latency (milliseconds)) when performing "model inference without noise removal" and "model inference with noise removal" shows a reduction in the average projected latency of about 5.5%. With reference to TABLE II, a comparison of hit ratio percentages (Hit ratio %) when performing a "simple moving average (SMA)" and "model inference with noise removal" likewise shows that improved tiering and data prefetching performance can be achieved across all the hit ratio metrics. Indeed, a comparison of the resulting latency (Latency (milliseconds)) when performing the "simple moving average (SMA)" and "model inference with noise removal" shows a reduction in the average projected latency of about 67%.

Figure 3:
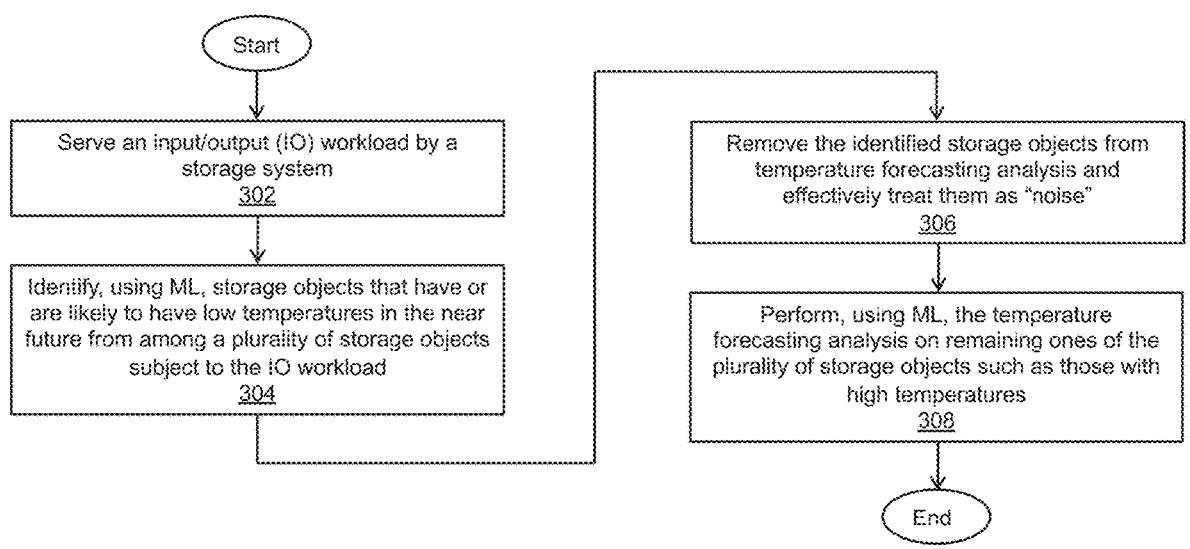
FIG. 3 is a flow diagram of an exemplary method of performing effective noise removal for biased ML based optimizations in a storage system.

A method of performing effective noise removal for biased machine learning (ML) based optimizations in a storage system is described below with reference to FIG. 3. As depicted in block 302, an input/output (IO) workload is served by a storage system. As depicted in block 304, storage objects that have or are likely to have low temperatures in the near future are identified, using ML, from among a plurality of storage objects subject to the IO workload. As depicted in block 306, the identified storage objects are removed from temperature forecasting analysis and effectively treated as "noise." As depicted in block 308, the temperature forecasting analysis is performed, using ML, on remaining ones of the plurality of storage objects such as those with high temperatures. In this way, temperature forecasting or prediction is performed, using ML, in a biased fashion over a relatively narrow range of storage object temperatures, thereby improving tiering and data prefetching performance, reducing memory and processing overhead, and so on.

Having described the above illustrative embodiments, various alternative embodiments and/or variations may be made and/or practiced. For example, it was described herein, with reference to one embodiment, that training data for the temperature forecasting ML algorithm 136 can cover the full spectrum 200 of slice IO activity. In an alternative embodiment, data corresponding to slices identified as cold (i.e., inactive) or likely to become cold in the near future can be removed as noise from the training data. In other words, such noise data can be removed during both model training and model inference.

In one experimental case, the effect of removing noise data during model training and model inference on the performance of the temperature forecasting ML model 124 is shown in TABLE III below:

TABLE III

| | Hit ratio % -Read BW- | Hit ratio % -Total BW- | Hit ratio % -Read IO- | Hit ratio % -Total IO- | Latency (milliseconds) |
|---|---|---|---|---|---|
| Model inference without noise removal | 85.91% | 79.67% | 69.67% | 56.69% | 0.20 msec |
| Model inference with noise removal | 86.57% | 80.72% | 70.86% | 57.45% | 0.19 msec |

With reference to TABLE III, a comparison of the resulting hit ratio percentages (Hit ratio %) when performing "model inference without noise removal" and "model inference with noise removal" shows that improved tiering and data prefetching performance can be achieved across all hit ratio metrics. Further, a comparison of the resulting latency (Latency (milliseconds)) when performing "model inference without noise removal" and "model inference with noise removal" shows a reduction in the average projected latency. Moreover, due to the removal of noise data during both model training and model inference, reductions in memory overhead and processing overhead can be achieved. In one experimental case, memory overhead is reduced from about 3.8 gigabytes (Gb) to 1.9 Gb, and processing overhead, in terms of inference time, is reduced from 6.45 seconds (secs) to 5.25 secs.

It was further described herein that the temperature forecasting ML model 124 can be employed to forecast or predict future temperatures of storage objects in a biased manner over a narrow range of high storage object temperatures, such as the upper range 202 of the spectrum 200 (see FIG. 2). Such forecasting or prediction of storage object temperatures over a narrow range of high temperatures can lead to improvements in tiering and data prefetching performance. In an alternative embodiment, the temperature forecasting ML model 124 can be employed to forecast or predict future temperatures of storage objects in a biased manner over a range of lower storage object temperatures, such as the lower range 206 (or sub-range thereof) of the spectrum 200. Such forecasting or prediction of storage object temperatures over a range of lower temperatures can lead to improvements in data archival performance.

It was further described herein that the noise removal ML model 122 can identify or classify, from input datasets, slices with forecasted or predicted levels of IO activity that will be zero or below a predetermined minimum level in the near future. In one embodiment, the predetermined minimum level of IO activity can be defined, for a slice, as a certain amount of data accesses (e.g., 10 kilobytes (Kb)) during a certain time interval (e.g., 5 minutes). In another embodiment, the predetermined minimum level of IO activity can be defined, for all slices subject to noise removal preprocessing, as a certain overall amount of data accesses (e.g., 100 Kb) during a certain time interval (e.g., 5 minutes). In still another embodiment, the predetermined minimum level of IO activity can be defined, for all slices subject to noise removal preprocessing, as a certain percentage (e.g., 1%) of the IO activity for the total slice population (e.g., 1 Gb).

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely, such as via a storage area network (SAN).

As employed herein, the term "storage array" may refer to a storage system used for block-based, file-based, or other object-based storage. Such a storage array may include, for example, dedicated storage hardware containing HDDs, SSDs, and/or all-flash drives.

As employed herein, the term "storage entity" may refer to a filesystem, an object storage, a virtualized device, a logical unit (LUN), a logical volume (LV), a logical device, a physical device, and/or a storage medium.

As employed herein, the term "LUN" may refer to a logical entity provided by a storage system for accessing data from the storage system and may be used interchangeably with a logical volume (LV). The term "LUN" may also refer to a logical unit number for identifying a logical unit, a virtual disk, or a virtual LUN.

As employed herein, the term "physical storage unit" may refer to a physical entity such as a storage drive or disk or an array of storage drives or disks for storing data in storage locations accessible at addresses. The term "physical storage unit" may be used interchangeably with the term "physical volume."

As employed herein, the term "storage medium" may refer to a hard drive or flash storage, a combination of hard drives and flash storage, a combination of hard drives, flash storage, and other storage drives or devices, or any other suitable types and/or combinations of computer readable storage media. Such a storage medium may include physical and logical storage media, multiple levels of virtual-to-physical mappings, and/or disk images. The term "storage medium" may also refer to a computer-readable program medium.

As employed herein, the term "IO request" or "IO" may refer to a data input or output request such as a read request or a write request.

As employed herein, the terms, "such as," "for example," "e.g.," "exemplary," and variants thereof refer to non-limiting embodiments and have meanings of serving as examples, instances, or illustrations. Any embodiments described herein using such phrases and/or variants are not necessarily to be construed as preferred or more advantageous over other embodiments, and/or to exclude incorporation of features from other embodiments.

As employed herein, the term "optionally" has a meaning that a feature, element, process, etc., may be provided in certain embodiments and may not be provided in certain other embodiments. Any particular embodiment of the present disclosure may include a plurality of optional features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method comprising:
    serving an input/output (IO) workload by a storage system, a plurality of storage objects being subject to the IO workload;
    identifying, from among the plurality of storage objects, storage objects that may have predetermined temperatures in a near future using a first machine learning (ML) model, the plurality of storage objects including the identified storage objects and a plurality of remaining storage objects;
    forecasting, by model inference, temperatures of the plurality of remaining storage objects using a second ML model; and
    performing storage tiering operations on the plurality of remaining storage objects, the storage tiering operations including moving the plurality of remaining storage objects to a specific storage tier of the storage system based on the forecasted temperatures of the plurality of remaining storage objects.

2. The method of claim 1 wherein the plurality of storage objects have temperatures spanning a spectrum of storage object temperatures, the spectrum of storage object temperatures including at least a first range of low temperatures and a second range of high temperatures, and wherein the identifying of the storage objects that may have the predetermined temperatures in the near future includes identifying the storage objects that may have low temperatures within the first range of the spectrum.

3. The method of claim 2 wherein the plurality of remaining storage objects have high temperatures within the second range of the spectrum, wherein the plurality of remaining storage objects constitute a minority of the plurality of storage objects, and wherein the forecasting of the temperatures of the plurality of remaining storage objects includes forecasting the temperatures of the minority of the plurality of storage objects having high temperatures within the second range of the spectrum.

4. The method of claim 2 further comprising:
    obtaining training data that includes data corresponding to storage objects having temperatures spanning both the first range and the second range of the spectrum of storage object temperatures; and
    training the second ML model using the training data.

5. The method of claim 2 further comprising:
    obtaining training data that includes data corresponding to storage objects having temperatures spanning only the second range of the spectrum of storage object temperatures; and
    training the second ML model using the training data.

6. The method of claim 1 wherein the plurality of storage objects have temperatures spanning a spectrum of storage object temperatures, the spectrum of storage object temperatures including at least a first range of low temperatures and a second range of high temperatures, and wherein the identifying of the storage objects that may have the predetermined temperatures in the near future includes identifying the storage objects that may have high temperatures within the second range of the spectrum.

7. The method of claim 6 wherein the plurality of remaining storage objects have low temperatures within the first range of the spectrum, wherein the plurality of remaining storage objects constitute a majority of the plurality of storage objects, and wherein the forecasting of the temperatures of the plurality of remaining storage objects includes forecasting the temperatures of the majority of the plurality of storage objects having low temperatures within the first range of the spectrum.

8. The method of claim 6 further comprising:
    obtaining training data that includes data corresponding to storage objects having temperatures spanning only the first range of the spectrum of storage object temperatures; and
    training the second ML model using the training data.

9. A system comprising:
    a memory; and
    processing circuitry configured to execute program instructions out of the memory to:
        serve an input/output (IO) workload, a plurality of storage objects being subject to the IO workload;
        identify, from among the plurality of storage objects, storage objects that may have predetermined temperatures in a near future using a first machine learning (ML) model, the plurality of storage objects including the identified storage objects and a plurality of remaining storage objects;
        forecast, by model inference, temperatures of the plurality of remaining storage objects using a second ML model; and
        perform storage tiering operations on the plurality of remaining storage objects, the storage tiering operations including moving the plurality of remaining storage objects to a specific storage tier of the storage system based on the forecasted temperatures of the plurality of remaining storage objects.

10. The system of claim 9 wherein the plurality of storage objects have temperatures spanning a spectrum of storage object temperatures, the spectrum of storage object temperatures including at least a first range of low temperatures and a second range of high temperatures, and wherein the processing circuitry is further configured to execute the program instructions out of the memory to identify the storage objects that may have low temperatures within the first range of the spectrum.

11. The system of claim 10 wherein the plurality of remaining storage objects have high temperatures within the second range of the spectrum, wherein the plurality of remaining storage objects constitute a minority of the plurality of storage objects, and wherein the processing circuitry is further configured to execute the program instructions out of the memory to forecast the temperatures of the minority of the plurality of storage objects having high temperatures within the second range of the spectrum.

12. The system of claim 10 wherein the processing circuitry is further configured to execute the program instructions out of the memory to:
   obtain training data that includes data corresponding to storage objects having temperatures spanning both the first range and the second range of the spectrum of storage object temperatures; and
   train the second ML model using the training data.

13. The system of claim 10 wherein the processing circuitry is further configured to execute the program instructions out of the memory to:
   obtain training data that includes data corresponding to storage objects having temperatures spanning only the second range of the spectrum of storage object temperatures; and
   train the second ML model using the training data.

14. The system of claim 9 wherein the plurality of storage objects have temperatures spanning a spectrum of storage object temperatures, the spectrum of storage object temperatures including at least a first range of low temperatures and a second range of high temperatures, and wherein the processing circuitry is further configured to execute the program instructions out of the memory to identify the storage objects that may have high temperatures within the second range of the spectrum.

15. The system of claim 14 wherein the plurality of remaining storage objects have low temperatures within the first range of the spectrum, wherein the plurality of remaining storage objects constitute a majority of the plurality of storage objects, and wherein the processing circuitry is further configured to execute the program instructions out of the memory to forecast the temperatures of the majority of the plurality of storage objects having low temperatures within the first range of the spectrum.

16. The system of claim 14 wherein the processing circuitry is further configured to execute the program instructions out of the memory to:
   obtain training data that includes data corresponding to storage objects having temperatures spanning only the first range of the spectrum of storage object temperatures; and
   train the second ML model using the training data.

17. A computer program product including a set of non-transitory, computer-readable media having instructions that, when executed by processing circuitry, cause the processing circuitry to perform a method comprising:
   serving an input/output (IO) workload by a storage system, a plurality of storage objects being subject to the IO workload;
   identifying, from among the plurality of storage objects, storage objects that may have predetermined temperatures in a near future using a first machine learning (ML) model, the plurality of storage objects including the identified storage objects and a plurality of remaining storage objects;
   forecasting, by model inference, temperatures of the plurality of remaining storage objects using a second ML model; and
   performing storage tiering operations on the plurality of remaining storage objects, the storage tiering operations including moving the plurality of remaining storage objects to a specific storage tier of the storage system based on the forecasted temperatures of the plurality of remaining storage objects.

18. The computer program product of claim 17 wherein the plurality of storage objects have temperatures spanning a spectrum of storage object temperatures, the spectrum of storage object temperatures including at least a first range of low temperatures and a second range of high temperatures, and wherein the identifying of the storage objects that may have the predetermined temperatures in the near future includes identifying the storage objects that may have low temperatures within the first range of the spectrum.

19. The computer program product of claim 18 wherein the method further comprises:
   obtaining training data that includes data corresponding to storage objects having temperatures spanning both the first range and the second range of the spectrum of storage object temperatures; and
   training the second ML model using the training data.

20. The computer program product of claim 18 wherein the method further comprises:
   obtaining training data that includes data corresponding to storage objects having temperatures spanning only the second range of the spectrum of storage object temperatures; and
   training the second ML model using the training data.

* * * * *